Aug. 30, 1960  H. C. HEBERT  2,950,806
APPARATUS FOR INTERLOCKING FLANGES OF CONTAINERS
ARRANGED FOR TRANSFER TO A STACK
Filed Feb. 19, 1957  4 Sheets-Sheet 1
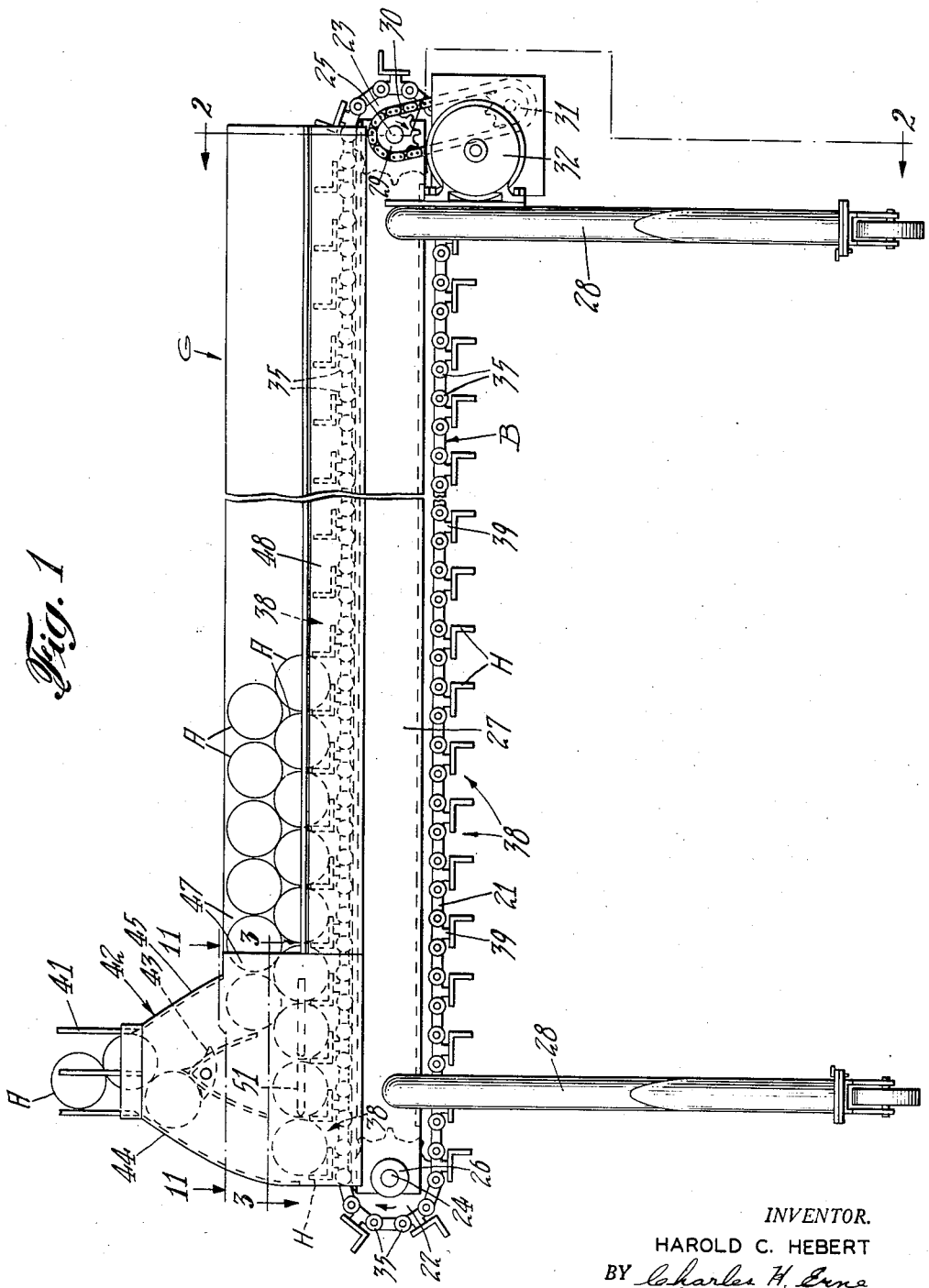
INVENTOR.
HAROLD C. HEBERT
BY
ATTORNEYS

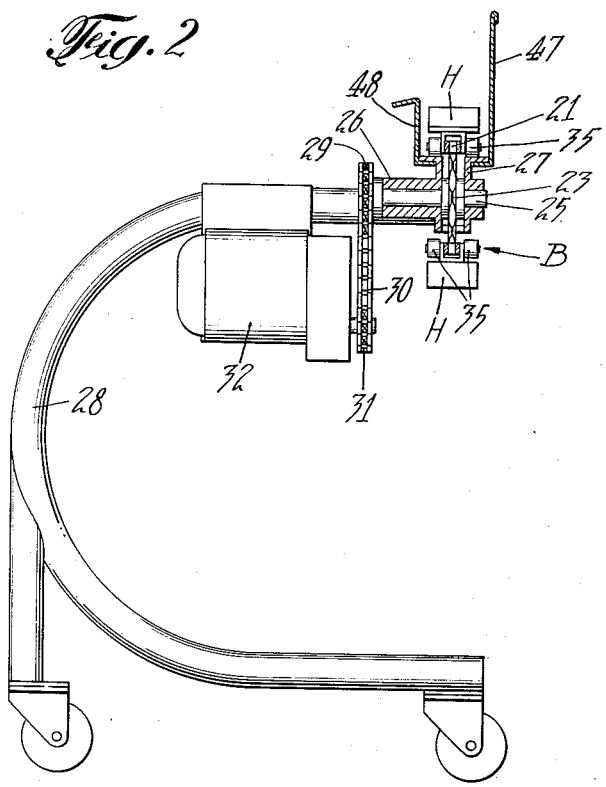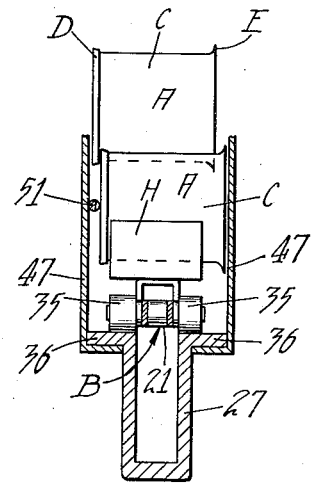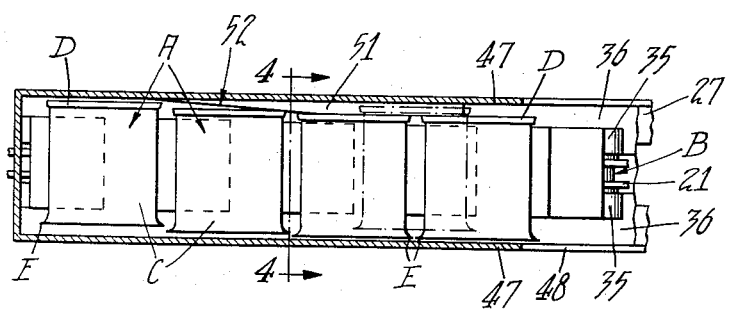

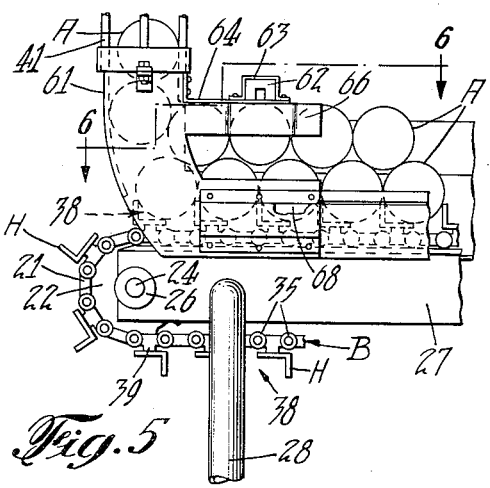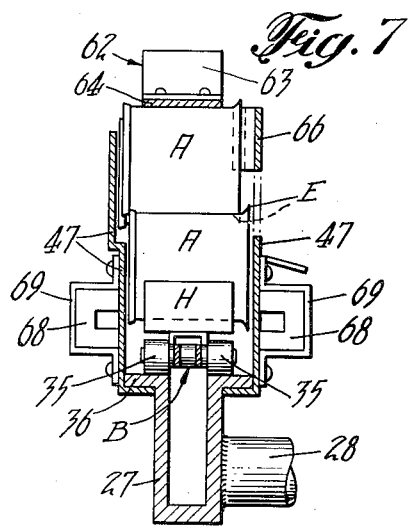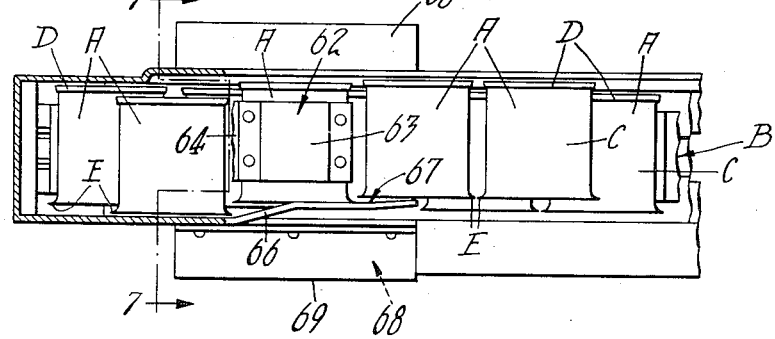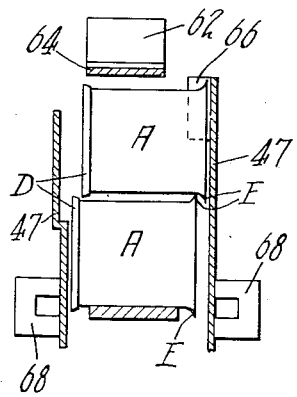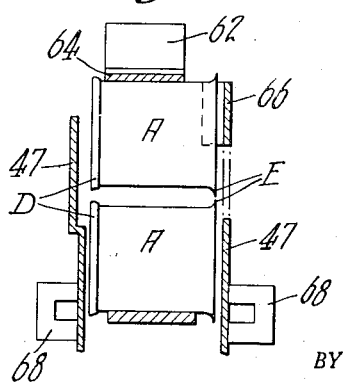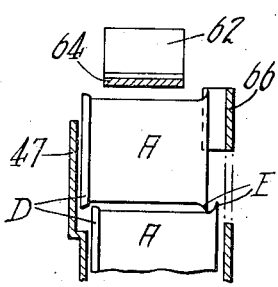

Aug. 30, 1960  H. C. HEBERT  2,950,806
APPARATUS FOR INTERLOCKING FLANGES OF CONTAINERS
ARRANGED FOR TRANSFER TO A STACK
Filed Feb. 19, 1957  4 Sheets-Sheet 4

INVENTOR.
HAROLD C. HEBERT
BY
ATTORNEYS

United States Patent Office

2,950,806
Patented Aug. 30, 1960

2,950,806

APPARATUS FOR INTERLOCKING FLANGES OF CONTAINERS ARRANGED FOR TRANSFER TO A STACK

Harold C. Hebert, Tampa, Fla., assignor to American Can Company, New York, N.Y., a corporation of New Jersey Filed Feb. 19, 1957, Ser. No. 641,173
8 Claims. (Cl. 198—35)

The present invention relates to the stacking of tubular articles such as cans and containers into shipping boxes and storage bins and the like and has particular reference to devices for interlocking the flanges of the cans or containers while they are being arranged in superimposed row or layer formation for transfer to a stack.

This application is a companion to my two following applications filed in the United States Patent Office, Serial Number 641,174 filed February 19, 1957, now Patent No. 2,892,531, on Apparatus for Grouping Containers for Transfer to Stacks and Serial Number 641,175 filed February 19, 1957, now Patent No. 2,828,000, on Apparatus for Grouping Containers in Different Combinations for Transfer to Stacks.

In the shipment and storage of empty cans or containers in bulk, the containers usually are stacked in orderly superimposed rows so as to occupy the least space and to facilitate handling during unloading. This stacking of the containers usually is effected manually by an operator having a fork provided with tines arranged to fit into a group of a predetermined number of containers so that he can lift them from a delivery conveyor and place them in stacked formation in compartments such as shipping boxes, storage bins, freight cars, trailer trucks and the like. Where superimposed rows or layers of containers are fed by the conveyor, the flanges of the containers are not uniformly interlocked and this condition prevents the formation of a vertically stable stack.

It is therefore an object of the instant invention to provide an apparatus for arranging cans or containers in superimposed multiple row or layer formation with the flanges of the cans or containers in one row or layer uniformly interlocked or disposed in front of or behind the flanges of the cans or containers in the immediately adjacent lower row or layer to vertically stabilize a stack made up from a plurality of such rows or layers piled on top of each other, thereby preventing the stack from leaning forward and toppling over.

Another object is the provision of such an apparatus for interlocking the container flanges simultaneously with the feeding of the containers into a superimposed multiple row or layer arrangement to facilitate transfer of the containers in groups to a stack.

Another object is the provision of such an apparatus wherein the interlocking of the container flanges is effected while the containers are arranged in staggered superimposed rows or layers.

Numerous other objects and advantages of the invention will be apparent as it is better understood from the following description, which, taken in connection with the accompanying drawings, discloses a preferred embodiment thereof.

Referring to the drawings:

Figure 1 is a side elevation of an apparatus embodying the instant invention, with parts broken away;

Fig. 2 is a transverse sectional view taken substantially along the broken line 2—2 in Fig. 1;

Fig. 3 is an enlarged horizontal plan section taken substantially along the line 3—3 in Fig. 1, with parts broken away;

Fig. 4 is a transverse section taken substantially along the line 4—4 in Fig. 3;

Fig. 5 is a fragmentary side elevation showing a modified form of the container entrance end of the apparatus as illustrated at the left in Fig. 1;

Fig. 6 is an enlarged horizontal plan section taken substantially along the broken line 6—6 in Fig. 5, with parts broken away;

Fig. 7 is a transverse section taken substantially along the broken line 7—7 in Fig. 6, with parts broken away;

Figure 11:
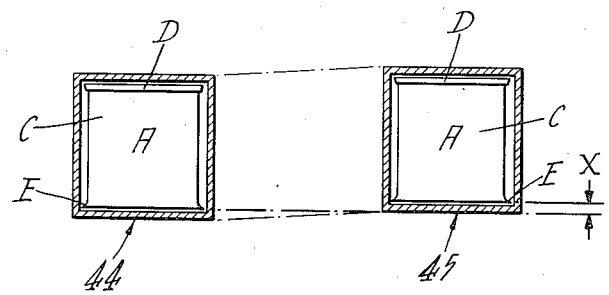
Figure 12:
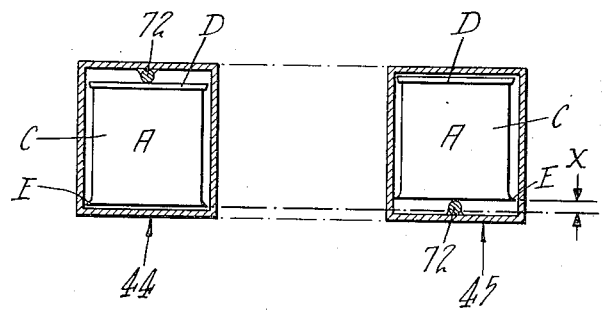

Figs. 8, 9 and 10 are schematic sectional views similar to Fig. 7 and showing various stages in the interlocking of the flanges of the containers; and Figs. 11 and 12 are enlarged schematic sectional views taken substantially along the line 11—11 in a modified form of the apparatus shown in Fig. 1.

As a preferred or exemplary embodiment of the instant invention, Figs. 1, 2, 3, 4 of the drawings disclose an apparatus for arranging two rows of empty cylindrical sheet metal cans or containers A in superimposed staggered relation on a conveyor B to facilitate manual stacking of the containers in shipping boxes, storage bins, freight cars, trucks and the like.

The containers A to be packed usually are of the type comprising cylindrical bodies C (Figs. 3 and 4) having bottom ends secured in place by suitable end seams D and usually have outwardly projecting flanges E surrounding their top open ends for the reception of covers after filling.

The containers A are received from any suitable source of supply such as the manufacturing lines or from storage and are fed in two separate single-line, substantially continuous processions, in an on-side or horizontal position, to the conveyor B which preferably is disposed in a horizontal position and which preferably is moved continuously. The conveyor B carries the containers to an operator's station G for transfer into a shipping box or bin disposed adjacent the station. The conveyor B is provided with a series of container support or spacer members H spaced along the length of the conveyor at distances substantially equal to the diameter of the containers so as to retain the containers in spaced relation.

The containers A from one of the lines entering the apparatus are fed directly to the support members H on the conveyor and thus form a continuous single line row extending from the entrance end of the apparatus, at the left in Fig. 1, to the operator's station G. The containers A from the other line entering the apparatus are fed into position on top of the first or lower row to thereby produce a superimposed or double row formation, the containers in the upper row falling into the valleys between the containers in the lower row to produce a staggered relation well known in the art.

As the double row of containers A on the conveyor B advance into the operator's station G, an operator manipulating a double row tined fork lifts the containers off the conveyor in groups and transfers them to the shipping box or storage bin in which the containers are built up in stacks.

In order that the containers being stacked in the shipping boxes or bins remain in vertically stacked stability so that they do not lean forward and topple over, each row of containers in the stack from the bottom to the top is set slightly back of its underlying row so as to uniformly interlock the flanges E of the containers in the same direction. This interlocking of the flanges E preferably is effected by devices of the instant invention which shift the containers of one row transversely relative to the containers in the adjacent row. Thus when the double row of containers reach the operator's station G for stacking, their flanges are uniformly interlocked in proper position for transfer of the containers to the stack.

Referring now to the detailed construction of the apparatus, the conveyor B preferably is a horizontally disposed endless chain 21 which operates over a pair of spaced sprockets 22, 23 mounted on respective shafts 24, 25 journaled in bearings 26 in an elongated frame 27 carried on legs 28. The sprocket shaft 25 preferably is the drive shaft of the conveyor and is rotated preferably continuously through a sprocket 29 mounted on the shaft 25 and driven by an endless chain 30 actuated by a driving sprocket 31 of an electric motor 32 carried on one of the legs 28.

The upper run of the conveyor chain 21 preferably is supported against sagging to maintain a horizontal position, by a plurality of rollers 35 which are attached to the chain at intervals along its length. These rollers 35 ride along horizontal tracks 36 formed on the frame 27.

The support or spacer members H extend along the entire length of the chain 21. These support members H preferably are angle shaped members which are spaced apart a distance substantially equal to the outside diameter of the containers A and which define between them open pockets 38 (Fig. 1) for the reception of the containers in the lower row fed to the conveyor. The support members H are secured to lugs 39 formed on the chain 21.

The containers A are fed to the conveyor B preferably by way of a conventional vertically disposed runway 41 (Fig. 1) which extends from the supply of containers and which leads into a conventional can divider 42 of any well known construction such as shown in my United States Patent 2,717,089, issued September 6, 1955 on "Apparatus for Manually Bulk Loading Cans Into Freight Cars and Other Compartments" and also shown in United States Patent 1,236,389, issued August 14, 1917 to A. M. Augensen on "Can Conveyor and Distributor." In such a divider a freely movable pivotally mounted rocker element 43 in the divider under the lower end of the entrance runway 41 is engaged and rocked by the containers as they enter the divider and by reason of its free mounting shifts with each passing container and thereby directs alternate containers in opposite directions into a pair of depending spaced runway extensions or outlets 44, 45 projecting down from the lower end of the entrance runway 41.

The runway outlets 44, 45 terminate at horizontally spaced delivery points over the top of the conveyor B and in vertically spaced relation thereto so as to drop the containers individually from outlet 44 at one delivery point into the conveyor pockets 38 and from outlet 45, at the other delivery point beyond the starting end of the first row containers, into the valleys between the first row of containers in the pockets 38 to build up the superimposed stagger-related, double row of containers on the conveyor. Side plates 47 extending from the divider 42 and disposed on opposite sides of the path of travel of the conveyor B guide the containers and retain them in a straight line as they advance toward the operator's station G. Along the front of the apparatus a front plate 48 forming an extension of the front plate 47 is lower than the back plate 47 to permit insertion of the fork into the containers to be removed from the conveyor.

In order to interlock the flanges E of the containers for proper stacking as hereinbefore mentioned, the containers A in the lower row are shifted axially or endwise, transversely of the conveyor, toward the front of the apparatus, i.e. toward the side viewed in Fig. 1, so as to locate the flanges E of these containers in an offset relation in front of the flanges E of the containers in the upper row as best shown in Figs. 3 and 4.

This shifting of the lower row containers preferably is effected as soon as they are received in the pockets 38 of the conveyor B and as they are advancing with the conveyor under the divider 42 so as to be substantially fully shifted into proper position before the containers from the outlet 45 of the divider are delivered into place on top of the lower row containers to build up the top row. For this purpose the apparatus is provided with offsetting means, comprising a shifting element, preferably a stationary offsetting rail 51 (Figs. 1, 3 and 4) which is secured to the inner face of one of the container guide plates 47 (the far plate as viewed in Fig. 1) and located adjacent the path of travel of the lower row of containers advancing with the conveyor B.

The pusher element or offsetting rail 51 extends under the divider 42 in the space between the outlets 44, 45 for a distance terminating substantially at the outlet 45 of the divider as shown in Fig. 1. The offsetting rail 51 is provided with a tapered face 52 (Fig. 3) so that lower row containers advancing with the conveyor ride onto the tapered face 52 and are pushed axially or laterally, transversely of the conveyor, into an offset position relative to the containers dropping into position on top of the lower row containers to form the upper row. As a result, the flanges E of the lower row containers are offset in front of the flanges E of the upper row containers for proper stacking as shown in Figs. 3 and 4.

In a modified form of the invention as disclosed in Figs. 5, 6, 7, 8, 9, 10 of the drawings, provision is made for axially shifting the upper row containers backwardly relative to the lower row containers to obtain the same flange interlocking result as explained above in connection with the preferred form of the invention. This modified form of the invention is particularly useful where the containers are fed from a single runway outlet 61 (Fig. 5) which delivers lower row containers to the pockets 38 of the conveyor B at one point and simultaneously delivers containers at a second point to the upper row containers on top of the lower row in the valleys between the containers in the lower row to effect a staggered layout formation as shown in Fig. 5 and with the flanges of the containers in the upper row offset relative to those in the lower row as shown in Figs. 6 and 10.

In this modified form of the invention, the containers in the upper row, after they have been fed into place on the lower row are lifted individually free of the lower row containers and while so lifted are shifted axially relative to the lower row containers to ensure the proper offset relation between the flanges E of the upper and lower row containers. For this purpose a magnet 62, which may be either a permanent magnet or an electromagnet, is disposed over the top of and adjacent the path of travel of the upper row containers as shown in Figs. 5 and 7. This magnet 62 preferably is held in place by a strap 63 which secures the magnet to a bracket 64 attached to the side of the runway of the container outlet 61. The magnet 62 is located above the path of travel of the upper row containers just a sufficient distance to lift a passing container from its initial position in a valley between two lower row containers as shown in Fig. 8 to a position shown in Fig. 9 where its flange E is above and clear of the flanges E of the two adjacent lower row containers.

The pressure exerted by the containers A in the upper row following the lifted container keeps the lifted container moving forward with the conveyor. While so advancing the lifted container moves past a pusher element offsetting rail 66 which is provided with a shaped inner face 67 formed to be engaged by the advancing lifted container and to push or divert the container axially, transversely of its path of travel and to thereby relocate its flange E from the position in front of the flanges E of the lower row containers as shown in Fig. 8 to the position in back of the flanges E of the lower row containers as shown in Fig. 10. The guide plates 47 of the apparatus are offset along the path of travel of the upper row containers as best shown in Figs. 6 and 7 to permit of this axial movement of these containers. When the lifted container advances to a point beyond the magnet 62 it falls away from the magnet and settles back into its original valley between the two adjacent lower row containers. In this manner the upper row containers are shifted to properly position their flanges relative to the flanges of the lower row containers to facilitate stability of the vertical rows in the completed stack.

In order to facilitate lifting of the upper row containers individually without interference with the lower row containers, the lower row containers in the region of the magnet 62 preferably are held down against the conveyor B. For this purpose an auxiliary hold-down magnet or other hold-down device is provided adjacent the path of travel of the lower row containers. By way of example the drawings illustrate a pair of magnets 68 disposed adjacent the path of travel of the lower row of containers A on the conveyor B to hold the containers in the conveyor pockets 38 as the containers pass under the upper magnet 62. These auxiliary magnets 68 preferably are held in place by straps 69 secured to the guide plates 47. If desired only one magnet 68 may be used in a location under the path of travel of the conveyor to effect the same result. In some cases it is contemplated that each support member H may be provided with a magnet or other hold-down device to retain the containers in their pockets 38.

In a further modified form of the apparatus as disclosed in Fig. 11, offsetting of the container flanges E is effected by offsetting one or the other of the outlets 44, 45 relative to the other a distance X. In the drawings the upper row outlet 45 is shown offset relative to the lower row outlet 44 so that the upper row containers as they are delivered from the outlet 45 fall into place on top of the lower row containers delivered from the outlet 44, in such a relation as to locate the flanges E of the upper row containers in back of the flanges E of the lower row containers. In a similar manner the outlet 44 may be offset relative to the outlet 45 so as to deliver the lower row containers in an offset relation with their flanges in back of the flanges of the containers in the upper row, if such relationship is desired.

It is also contemplated that instead of bodily offsetting the outlets 44, 45 as in the construction of Fig. 11, container offsetting guide rails 72 similar to the tapered offsetting rail 51 (Fig. 3) may be used in the outlets 44, 45 as shown in Fig. 12 to shift the containers into a desired offset relation to properly interlock their flanges E.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for arranging tubular containers having projections, such as end seams and flanges, in superimposed multiple row formation for transfer to a stack, comprising a conveyor extending along a substantially horizontal path of travel, primary feeding means for delivering containers at a first delivery point to said conveyor to form a lower row of containers thereon, secondary feeding means for delivering containers at a second delivery point spaced horizontally from said first delivery point and directly above said containers on the conveyor to form an upper row of containers, and offsetting means disposed intermediate said first and second delivery points for shifting the containers in one of said rows relative to the other to offset the projections on containers in one of said rows relative to projections on containers in the other row whereby interference between said projections is prevented.

2. An apparatus of the character defined in claim 1 wherein said offsetting means is a shifting element engageable with containers in said lower row between said first and second delivery points for shifting said containers in the lower row laterally to offset projections on containers in the lower row relative to like projections on containers in the upper row.

3. An apparatus of the character defined in claim 1 wherein at least a portion of said secondary feeding means extends substantially horizontally over said containers on the conveyor between said first and second delivery points and includes can supporting means on said portion of the secondary feeding means for holding the containers thereon spaced from said containers on the conveyor whereby shifting of the containers in one row relative to those in the other row is facilitated and interference between said projections on the container is prevented.

4. An apparatus of the character defined in claim 3 wherein said offsetting means is disposed adjacent the path of containers on said substantially horizontal portion of the secondary feeding means intermediate said first and second delivery points for shifting the containers on said portion laterally while they are spaced from the containers on the conveyor.

5. An apparatus of the character defined in claim 3 wherein said can supporting means includes container lifting means above the path of travel of containers in said horizontal portion of the feeding means for lifting said containers free of the containers on the conveyor to facilitate said lateral shifting of containers in one row relative to containers in the other between said delivery points.

6. An apparatus of the character defined in claim 5 wherein there is provided hold down means disposed adjacent the path of travel of the lower row containers on said conveyor and beneath said horizontal portion of the secondary feeding means for holding said lower row containers against possible vertical displacement during said shifting of containers in one row relative to containers in the other between said delivery points.

7. An apparatus of the character defined in claim 6 wherein said containers are made, at least in part, of magnetic material and said container lifting and hold down means include magnets.

8. An apparatus for arranging tubular containers having projections such as end seams and flanges, in superimposed multiple row formation for transfer to a stack, comprising a conveyor extending along a substantially horizontal path of travel, means for actuating said conveyor, primary feeding means disposed above said conveyor, secondary feeding means disposed directly above the path of containers on said conveyor, said primary and secondary feeding means terminating at their respective delivery points in primary and secondary outlets one of which delivers a lower row of containers onto said conveyor and the other of which delivers a superimposed row of containers onto said lower row in the valleys between said lower row containers and wherein there is provided offsetting elements in at least one of said outlets to shift the containers in one outlet laterally relative to the containers in the other outlet for delivering the containers from said one outlet with their projections in a predetermined offset relation to the projections on the containers delivered from said other outlet.

References Cited in the file of this patent
UNITED STATES PATENTS

| 1,157,017 | Lowe | Oct. 19, 1915 |
| 2,420,343 | Albertoli | May 13, 1947 |
| 2,639,823 | Madden | May 26, 1953 |
| 2,715,469 | Burt | Aug. 16, 1955 |